United States Patent [19]

Lander

[11] Patent Number: 4,770,440
[45] Date of Patent: Sep. 13, 1988

[54] COMBINATION UTILITY ATTACHMENT AND STAND FOR RIDING LAWN MOWERS

[76] Inventor: Glyn F. Lander, Rte. 3, Box 223, Lumberton, Miss. 39455

[21] Appl. No.: 51,326

[22] Filed: May 19, 1987

[51] Int. Cl.$^4$ .................... B60R 9/06; B60R 27/00
[52] U.S. Cl. .................... 280/760; 280/763.1; 280/769; 280/762; 224/42.43; 224/42.08; 56/202; 296/3
[58] Field of Search ............. 280/760, 762, 763.1, 280/769, 770; 224/42.43, 42.07, 42.08; 56/202, 16.6; 296/3, 37.5; 182/127

[56] References Cited

U.S. PATENT DOCUMENTS

| | | | |
|---|---|---|---|
| 1,865,365 | 6/1932 | Foote | 280/760 |
| 2,779,524 | 1/1957 | Carlson | 224/42.08 |
| 3,687,344 | 8/1972 | Nixon | 224/29 R |
| 3,716,977 | 2/1973 | Jackson | 56/202 |
| 3,805,500 | 4/1974 | Sweet | 56/202 |
| 4,015,406 | 4/1977 | Witt et al. | 56/202 |
| 4,042,054 | 8/1977 | Ward | 180/68.5 X |
| 4,182,521 | 1/1980 | Durand et al. | 280/202 |
| 4,186,546 | 2/1980 | Machado et al. | 56/16.6 |
| 4,277,008 | 7/1981 | McCleary | 280/760 |
| 4,393,645 | 7/1983 | Moore | 56/202 |
| 4,406,384 | 9/1983 | Schantz | 224/42.07 |

Primary Examiner—David M. Mitchell
Assistant Examiner—Tamara L. Finlay
Attorney, Agent, or Firm—Dowell & Dowell

[57] ABSTRACT

A combinaion utility attachment and support stand for conventional riding lawn mowers which includes a vertically oriented frame that is attached to the rear end of the lawn mower so as to extend perpendicularly to the length thereof and which supports an upper load carrying receptable having a pivotable rear wall which is generally vertically aligned in parallel relationship with the frame when in a closed position and a lower load support shelf wherein the load support shelf is pivotable into substantially flush engagement with the frame thereby creating an elongated platform with the rear wall of the load carrying receptable upon which the lawn mower may be supported on its end.

12 Claims, 3 Drawing Sheets

COMBINATION UTILITY ATTACHMENT AND STAND FOR RIDING LAWN MOWERS

BACKGROUND OF THE INVENTION

1. Field of the Invention

This invention is generally directed to attachments for riding lawn mowers and more specifically to a combination load carrying attachment and stand for supporting a conventional riding lawn mower in upright position so that the underside thereof may be easily serviced. The attachment includes a frame which is detachably mountable to the rear end of a conventional riding lawn mower and upon which an upper load carrying receptacle is supported so as to extend inwardly of the rear end of the lawn mower so as to be positioned generally over the rear axle and drive wheels of the mower and which also includes a lower load supporting shelf which extends from the lower portion of the frame and which is pivotable with respect thereto so that the lower shelf is selectively aligned over the frame with the rear wall of the load carrying receptacle to provide an elongated base or surface upon which the lawn mower may be supported when on its end. The upper receptacle and the pivotable lower shelf are aligned with respect to the frame so as to create a substantially continuous support surface to support the lawn mower in a vertical position. The upper receptacle also includes a pivotable rear wall which may be extended horizontally to provide a second shelf which is in elevated relationship to the lower shelf so that objects of varying sizes may be carried by the receptacle and shelf as desired.

2. History of the Art

Today's conventional riding lawn mowers or lawn and garden tractors are utilized not only for the primary purpose of cutting lawns but are also utilized to perform additional tasks such as plowing, seeding, hauling, thatching, raking and the like. To this end, there have been many implements which have been specially designed and adapted for use with various types and styles of riding lawn mowers or lawn and garden tractors. Included in these implements are trailers which may be towed behind lawn mowers and which are utilized to transport loads from one point to another.

A problem associated with traditional load carrying trailers which are used with lawn mowers is that they are not only costly to acquire but they must be separately stored when not in use thereby requiring that additional storage space be set aside for such equipment. In addition to the foregoing, such trailers restrict the maneuverability of the lawn mower when they are in use. Many trailers are wider than the conventional riding mowers and therefore limit the accessibility of the mower with respect to trees, bushes and various structures. A further drawback with conventional load carrying trailers is that they require that the load be displaced rearwardly of the lawn mower drive wheels so that that the entire load must be pulled by the action of the drive wheels. This often results in poor traction for the lawn mower or tractor, a condition which is or may be dangerous in the event that the vehicle is being simultaneously used in cutting operations.

Other types of attachments have been designed to be directly supported by the rear of a lawn mower as opposed to being trailered behind the lawn mower. Most of these accessories are directed to grass catching equipment such as the type which are disclosed in U.S. Pat. Nos. 3,716,977 to Jackson and 4,393,645 to Moore. These attachments are specifically designed for the single purpose of catching cut grass and other debris which are being discharged from the cutter housing of the lawn mower. Therefore, such attachments cannot be utilized for other purposes.

A problem inherent with the use of any type of attachment which is secured to the rear end of a lawn mower is that it makes maintenance of the undercarriage and cutting mechanisms of the lawn mower more difficult. It frequently becomes necessary to service the under portion of a lawn mower either to adjust the tension on the clutch or brake mechanism or to replace drive or cutting belts or, perhaps, to gain access to the cutter blades to perform routine sharpening maintenance. Although some type of conventional mowers have been designed to include drop-out cutter blade housings, such housings are difficult to maneuver when they are dropped relative to the lawn mower and, also, the lawn mower must be raised over the blade housings in order to separate the housing from the mower.

Traditionally, hoists or ramps are used to elevate the front end of a lawn mower or garden tractor in order to gain access to the undercarriage. This requires both the need for hoisting equipment and the structure to mount the hoisting equipment to in such a manner that the mower will be secured in elevated position. Such prior art maintenance techniques are not only hazardous but require additional costly equipment. Further, if an attachment such as a grass catcher is connected to the rear end of the lawn mower, such attachment must be removed in order to tilt the lawn mower about its rear axle so that the mower may be supported or positioned in a vertical position. Therefore, such attachments must be removed prior to maintenancing the undercarriage of lawn mowers and thereby require additional work to be performed when maintenance becomes necessary.

Some additional examples of rear mounted prior art attachments for tractors or mowers include U.S. Pat. Nos. 1,865,365 to Foote; 3,805,500 to Sweet and 4,015,406 to Witt et al.

SUMMARY OF THE INVENTION

This invention is generally directed to a load carrying attachment which may be selectively mounted to the rear of a conventional riding lawn mower and which is designed to be collapsed to provide a stable platform upon which the conventional lawn mower may be supported and retained in a vertical position thereby facilitating the maintenance to the undercarriage and cutting mechanism of the lawn mower. The attachment includes a vertical frame which is secured to the rear end of a lawn mower and which extends upwardly with respect thereto. A first cargo receptacle or container is mounted to the upper portion of the frame and extends inwardly of the mower so as to be in substantially vertically aligned position over the rear drive axle and wheels of the lawn mower. The upper receptacle includes enclosed side walls and a pivotable rear wall which may be lowered to a generally horizontal position so as to provide a shelf-like structure for supporting articles which are larger than the size of the container or receptacle. Supports such as chain elements are provided for retaining the shelf-like element in a fixed horizontal position when it has been extended. The rear wall of the receptacle is generally formed parallel to and adjacent the plane defined by the vertical extending frame element so as to be in overlying relationship therewith. The attachment further includes a lower shelf element which is pivotally secured to the lower portion of the vertically extending frame and is pivotable from a horizontal position extending rearwardly from the mower to a position which is substantially flush with the frame. Support chains or other elements are secured to the lower shelf element to stabilize the lower shelf when in an extended horizontal position. The lower shelf may be extended to support lighter weight loads rearwardly of the lawn mower and may be collapsed into flush position with the frame in order to provide a continuous supporting surface together with the rear wall of the upper container or receptacle upon which the mower may rest when the lawn mower is tilted on its rear end.

It is a primary object of the present invention to provide an attachment for conventional riding lawn mowers which will provide at least one receptacle on the rear end thereof which can be utilized to haul various items and which receptacle is aligned with respect to a mounting frame in such a manner as to provide a stable support base upon which the lawn mower may be seated in a vertical orientation to allow the cutting mechanism and undercarriage of the lawn mower to be serviced or maintenanced.

It is another object of the present invention to provide an attachment for conventional lawn mowers or lawn and garden tractors which in the preferred embodiment includes at least two separate article carrying members which are vertically spaced with respect to one another thereby permitting tall items to be supported on one member without obstruction by the other member.

It is another purpose of the invention to provide an attachment or implement for conventional lawn mowers or lawn and garden tractors which permits a plurality of articles or separate loads to be transported by the vehicle and which implement may be simultaneously folded or oriented to provide a support base for retaining the tractor on its rear end in order to perform maintenance on the undercarriage thereof.

It is yet another object of the present invention to provide an attachment for conventional riding lawn mowers and lawn and garden tractors which includes a first load carrying receptacle which is mounted in elevated relationship in generally vertical alignment over the rear drive axle of the vehicle in such a manner that the weight of the load being transported within the container is distributed over the drive wheels to thereby facilitate the traction of the vehicle.

It is also an object of the present invention to provide an attachment for conventional lawn mowers which includes a pair of laterally spaced and yet vertically alignable load carrying components which are vertically spaced with respect to one another and wherein the upper load carrying component may be horizontally extended to provide for an increased load carrying surface.

It is also an object of the present invention to provide a load carrying apparatus or attachment for conventional lawn mowers or lawn and garden tractors which provides space for carrying a plurality of items relative to the lawn mower and which is designed so as to not adversely effect the maneuverability of the mower during normal cutting or mowing operations.

It is also an object of the present invention to provide a load carrying implement for lawn mowers and lawn and garden tractors which is selectively mounted to the rear of the lawn mower or tractor and which includes a compartment which is spaced above and in general alignment with the rear drive axle of the lawn mower but which may be pivoted away from such alignment when the lawn mower is in a conventional position so as to permit access to any components of the lawn mower which are positioned beneath the implement.

DESCRIPTION OF THE PREFERRED EMBODIMENT

Figure 1:
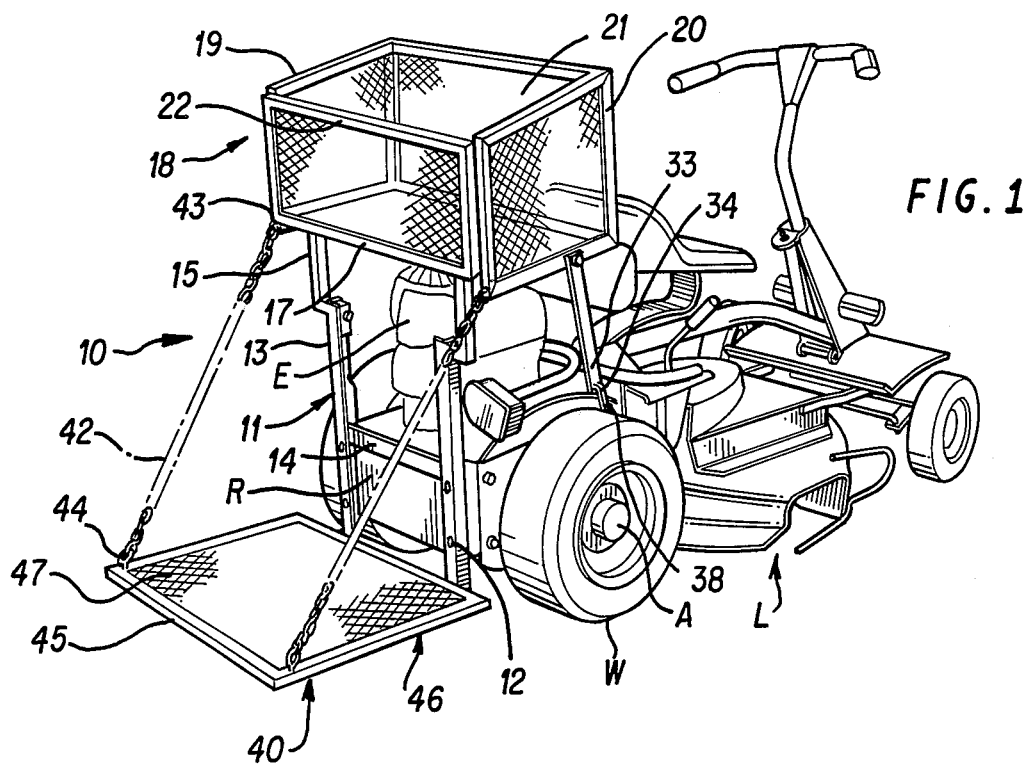
FIG. 1 is an illustrational view showing the load carrying apparatus of the present invention as it is mounted to the rear end of one style of conventional lawn mower.

With continued reference to the drawings, the load carrying attachment 10 of the present invention is illustrated as it is attached to one style or type of conventional riding lawn mower L. The riding lawn mower disclosed includes an engine E which is mounted adjacent the rear of the vehicle and generally over the drive axle A of the rear drive wheels W. Although a rear engine mount style of lawn mower is disclosed in the drawings, it should be emphasized that the carrier attachment for the present invention may be selectively attached to any style of riding lawn mower or lawn and garden tractor with modification only being necessary to the frame or support arms which secure the attachment to the lawn mower.

The carrier attachment 10 includes a main mounting frame 11 which is secured to the rear R of the lawn mower L by a plurality of bolts 12 which extend into the rear wall of the lawn mower chassis. The mounting frame 11 includes a pair of vertically extending support posts 13 which are reinforced by a horizontal stabilization plate 14. A pair of generally L-shaped support members 15 are securely mounted to the upper portion of the post 13 and 14 and extend upwardly into engagement with the lower frame 17 of an upper load carrying receptacle 18. In the embodiment of the invention shown in FIG. 4, the support members 15' define an open channel in which mounting pins 16 which are carried by the lower frame 17 of the upper load carrying receptacle 18 are selectively received. The pin members 16 may be locked into engagement with the members 15' by suitable fastening means such as bolts or pins (not shown).

The load carrying receptacle 18 includes the bottom frame 17 which is welded or otherwise secured to a pair of side frames 19 and 20 and a front panel 21. A rear panel 22 is hinged about hinge members 23 to the rear edge of the lower frame 17 so as to be pivotable with respect to the side wall members or frames 19 and 20. Each of the front, rear and side wall frames are covered by a metallic mesh material or otherwise covered so as to prevent material from passing through such walls when placed within the receptacle. The bottom 24 of the receptacle may include the same mesh material or may include a metallic or wood bottom piece which is supported by the lower frame 17. The hinged rear panel 22 may be selectively oriented to a generally horizontal position so as to form an extension of the bottom wall 24 of the receptacle. A pair of chain supports 25 are provided along each side of the hinged rear panel and are secured at one end to eyelets attached to the corners of the panel and at their remote ends in the upper corners of the side walls 19 and 20. The chains are of a length to support the rear wall 22 in a horizontal orientation. When the rear wall is pivoted about hinge elements 23 into vertical position adjacent the side walls 19 and 20, locking pins 26 are inserted through aligned eyelets which are mounted on the side frames 19 and 20 and the side walls of the movable panel.

To further brace the load carrying receptacle 18 with respect to the lawn mower, a pair of forward support legs 30 are selectively bolted to the bottom of the side wall frames 19 and 20 and extend downwardly into engagement with the chassis of the lawn mower. Each support leg includes a mounting end portion 33 having a spaced flanged element 34 connected thereto whereby the end portion 33 and the spaced flange 34 form a U-shaped mounting joint which overlies a portion of the chassis of the lawn mower and which is selectively connected thereto to by bolts 38. In the embodiment of the invention shown in FIG. 4, each of the adjustable legs 30' includes an upper tubular portion 31 in which is slidingly received a telescoping base member 32. The extendable base members 32 of the adjustable legs may be selectively locked in adjusted position to the tubular portions 31 by appropriate pins 35 which pass through aligned openings 36 through each member 31 and 32. As the lower portion of each of the mounting legs 32 is adjustable, it is possible to mount the load carrying receptacle to various sizes and styles of lawn mowers without having to require changes in the support legs.

Figure 5:
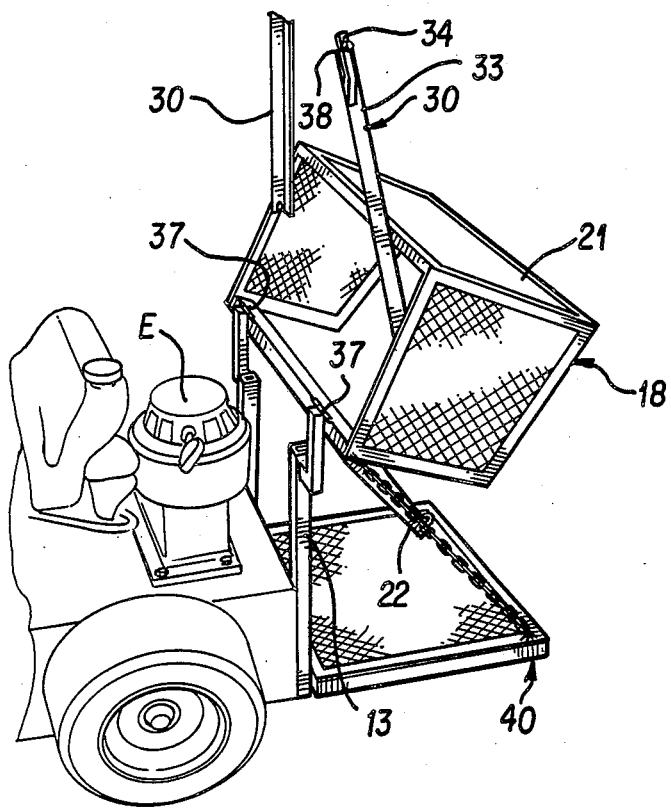
FIG. 5 is a perspective view of the invention illustrating the positioning thereof when access to the lawn mower is necessary.

As the load carrying receptacle 18 may be mounted over portions of a lawn mower to which access will be necessary, the load carrying receptacle is preferably pivotally mounted by hinge members 37 to support members 15 (or to the mounting pins 16 in the alternate embodiment). With reference to the conventional riding mower shown in the drawings, the engine is mounted along the rear portion of the lawn mower so that the load carrying receptacle 18 is in an overlying position with respect to the engine. When it is necessary to gain access to the engine, the mounting bolts 38 which connect the support legs 30 are removed and thereafter the receptacle 18 may be pivoted about hinge members 17 to the remote position shown in FIG. 5 of the drawings. Further, in the alternate embodiment, if additional access is necessary or if it is desired to move the receptacle 18 from the mounting frame, the bolts are removed from the pin members 16 and thereafter the receptacle lifted from engagement with the mounting portions 15' of the mounting frame.

The load carrying attachment 10 of the present invention also includes a lower load support shelf 40 which is mounted by hinges 41 to the lower portions of the mounting frame members 13. During use, the load supporting shelf 40 extends rearwardly of the lawn mower and is maintained generally horizontal by way of support chains 42. The chains are attached at one end to eyelets 43 secured to the lower side walls 19 and 20 of the upper load carrying receptacle and at their other ends to eyelets 44 which are secured to the outer end portion 45 of the shelf member. The shelf may be constructed having a metallic frame 46 which supports an inner expanded metal or mesh material 47.

Figure 2:
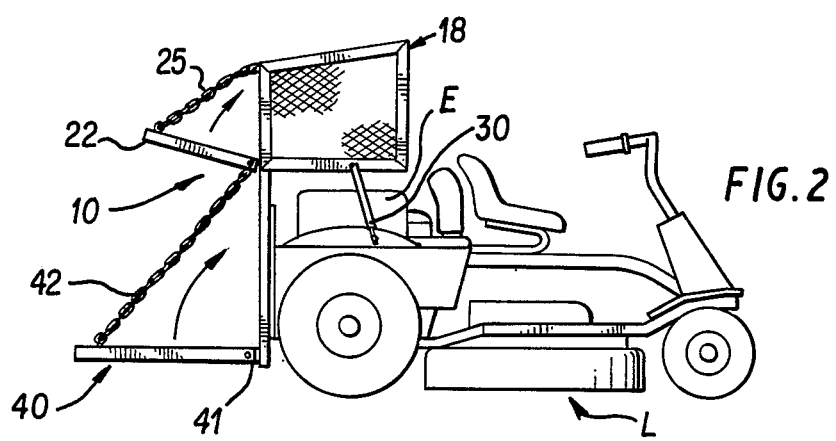
FIG. 2 is a side elevational view of the invention showing the pivotal movement of the rear wall of the upper load carrying container and of the pivotable relationship of the bottom shelf with respect to the frame and rear end of the lawn mower.

With respect to FIG. 2 of the drawings, it should be noted that the load supporting shelf 40 is positioned vertically below and rearwardly offset with respect to the upper load support receptacle 18. In this manner and when the rear wall 22 of the receptacle is in its upward or closed position, a load may be placed on the lower shelf and extend upwardly and vertically above the load carrying receptacle without interfering with any items being transported in the receptacle. This arrangement is particularly advantageous when transplanting trees and the like wherein the tree with the ball of dirt may be supported on the shelf 40 with the main trunk of the tree extending upwardly above the load support shelf 18. Fertilizers and other materials necessary for planting may thereafter be positioned within the load support receptacle.

Figure 3:
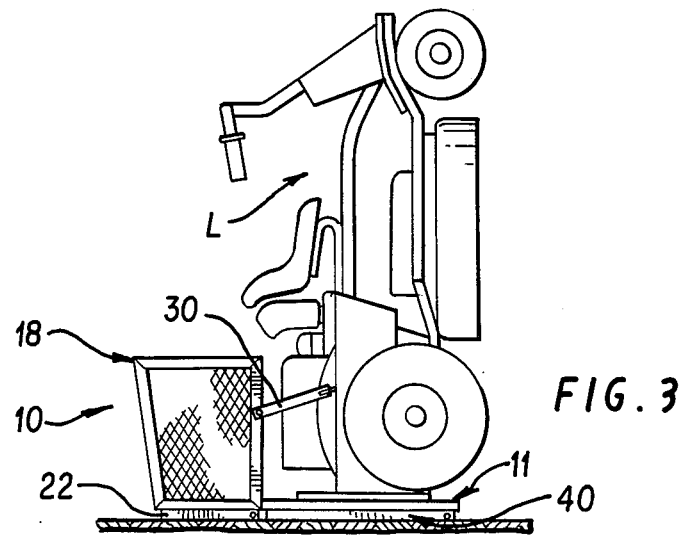
FIG. 3 is an illustrational side view showing the implement of the present invention utilized as a support base for a lawn mower.
Figure 4:
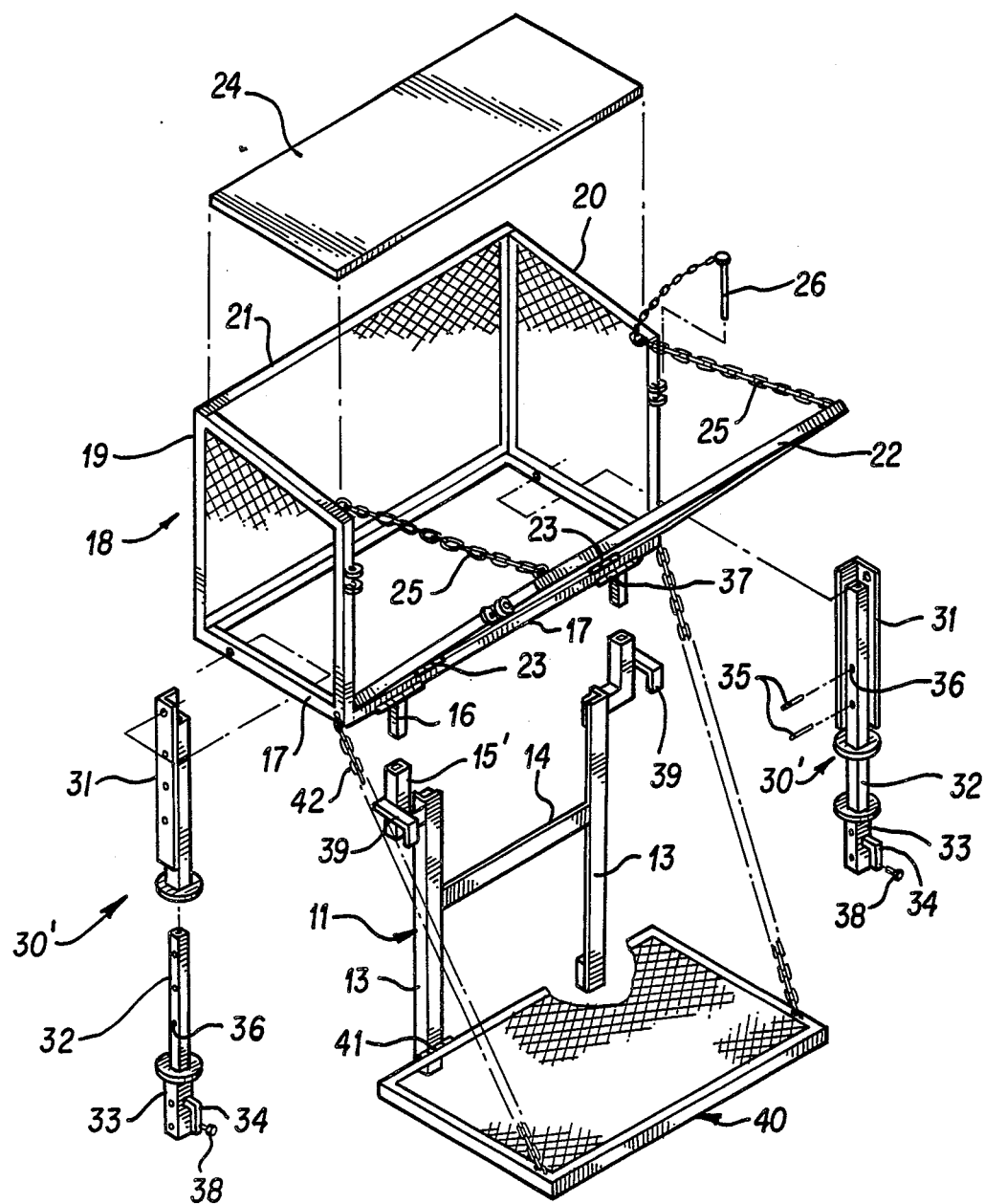
FIG. 4 is an assembly view of a second embodiment of the load carrying implement or attachment of the present invention having various adjustable components associated therewith.

The load support shelf 40 is also particularly designed to cooperate with the vertical support frame 11 and the rear wall 22 of the upper load support receptacle in that the shelf is pivotably mounted so as to be selectively positioned in flush engagement with the vertical posts 13 of the mounting frame. The shelf may be retained in position against the mounting frame by a pair of locking brackets 39 which are pivotally mounted to the support member 15' as shown in the embodiment of FIG. 4. In the closed or raised position, the exposed surface of the lower shelf is generally coplanar or aligned with the exterior surface of the rear wall 22 of the upper receptacle. The rear wall of the upper receptacle and the lower load support shelf thereby form a continuous support pad which may be utilized to stabilize the lawn mower when it is positioned on end as shown in FIG. 3 of the drawings. In the position shown in FIG. 3, the mower rests on the lower shelf and on the rear wall of the upper receptacle and is stabilized so that maintenance may be performed on the undercarriage and the cutting blades of the lawn mower.

In order to insure that the load carrying attachment of the present invention may be utilized without interference with the normal operation of the lawn mower, the width of the lower mounting shelf and the upper load support receptacle are generally designed to coincide with the maximum width of the vehicle or lawn mower so that no portions thereof extend laterally of the lawn mower. With this design, neither the shelf or receptacle will interfere with the normal passage of the lawn mower between obstacles or adjacent structures or natural barriers.

In the use of the attachment of the present invention, once the mounting frame 11 has been attached to the rear end of the lawn mower, the load carrying receptacle 18 is connected by way of hinge members 37 to the support members 15. In the alternate embodiment, the legs 16 are aligned with the tubular upper end portions of the mounting members 15' and, thereafter, the receptacle lowered so that the legs enter into the tubular supports. Appropriate fasteners such as appropriate screws or bolts are then threaded through the legs and supports. The load carrying receptacle 18 is supported generally vertically over the rear axle of the lawn mower and stabilized by the support legs 30. In the alternate embodiment of FIG. 4, the base members 32 of the support legs 30' are extended downwardly into engagement with a portion of the lawn mower chassis adjacent the main frame thereof. During initial installation, it may be necessary to drill holes through the lawn mower chassis adjacent the points where the mounting end portions 33 and 34 of the support legs are to be attached. Thereafter, the support legs are secured with appropriate fasteners such as bolts or screws 38 to the chassis. In the alternate embodiment, as the telescoping members are adjustable relative to one another, it is necessary to secure the two members in an adjusted position. Once the extendable lower portion of the support arms is spaced at the appropriate distance, pins or other members 35 are inserted through one or more aligned openings 36 to adjust the elements with respect to one another.

With the frame mounted to the rear of the lawn mower, the hinged lower support shelf 40 is attached to the lower portion of the frame by way of the hinges 41. The support chains 42 are thereafter connected between the eyelets 43 and 44 to insure that the shelf is maintained in a proper horizontal orientation. Articles may then be placed either on the support shelf 40 or retained in the upper receptacle 18. In the event that larger articles are to be carried in the upper receptacle, the rear wall thereof may be released and extended horizontally utilizing the support chains 25 to maintain the rear wall in a horizontal relationship generally parallel to the lower shelf 40. The alignment of the upper receptacle 18 above the rear drive axle A will facilitate the traction of the drive wheels and will also help to counterbalance any weight carried by the shelf 40.

When it becomes necessary to perform maintenance on the undercarriage of the lawn mower such as to adjust the clutch or brake mechanisms or to replace cutting or drive belts or to sharpen or replace the cutter blades, the lawn mower may be rotated about its rear axle A so that the front end thereof is extended upwardly as shown in FIG. 3 of the drawings. During this manipulation, the lower shelf element 40 will be collapsed into abutting relationship flush with the mounting frame 11 and in general coplanar alignment with the rear wall 22 of the receptacle 18. In this manner, the rear wall of the receptacle and the lower shelf provide a flat stable base which is reinforced by the mounting frame so that the mower is securely supported in an upright position without fear of being tilted or falling during maintenancing.

The upper receptacle 18 may be moved from its overlying position with portions of the lawn mower, the mounting bolts 38 connecting the support legs 30 or 30' may be disengaged from the chassis and the receptacle thereafter pivoted about the hinge elements into an out of the way position. Thereafter, the shelf may be realigned and the support legs secured so that the receptacle is fixedly mounted with respect to the lawn mower.

The component parts of the attachment of the present invention are preferrably constructed of metal framing with expanded metal mesh being connected by welding to the frame elements. In some embodiments, it may be possible to form the components of the invention utilizing plastic or wooden materials.

What is claimed is:

1. A load carrying attachment for riding lawn mowers which have a rear axle adjacent the rear end thereof comprising a vertical frame having upper and lower end portions, means for securing said vertical frame to the rear end of the lawn mower, a first load carrying receptacle carried by said upper portion of said frame, said first load carrying receptacle extending forwardly of the rear end of the lawn mower and having a rear wall which is generally vertically aligned and substantially parallel with said vertical frame, a shelf member mounted adjacent said lower end portion of said frame, said shelf member being positionable substantially in abutting engagement with said vertical frame so as to be substantially coplanar with said rear wall of said first load carrying receptacle whereby said rear wall of said first load carrying receptacle, said shelf member and said vertical frame form a stabilizing support surface which may be utilized to retain the lawn mower in a vertical upright position on the rear end thereof.

2. The load carrying attachment of claim 1 in which said shelf member is pivotally connected to said lower end portion of said vertical frame so that said shelf member may be extended rearwardly of the lawn mower, and means for retaining said shelf member in a substantially horizontal position rearwardly of the lawn mower.

3. The load carrying attachment for riding lawn mowers of claim 2 in which said first load carrying receptacle includes a rear wall which is pivotally connected thereto whereby said rear wall may be extended generally horizontally rearwardly of said vertical frame, and means for supporting said rear wall of said first load carrying receptacle in a horizontal position.

4. The load carrying attachment of claim 3 including a pair of spaced support legs extending downwardly from said first load carrying receptacle, said support legs having remote end portions and means for connecting said remote end portions of said load support arms to the chassis of the lawn mower.

5. The load carrying attachment of claim 4 in which said support legs include an upper portion and a lower portion which are slideable relative to one another and securing means for locking said lower portion to said upper portion.

6. The load carrying attachment of claim 5 in which said vertical frame includes upper tubular support means, said first load carrying receptacle having downwardly extending connector portions, said connector portions of said first load carrying receptacle being selectively receivable within said tubular end portions of said vertical frame, and means for selectively securing said connector portions of said first load carrying receptacle within said tubular end portions of said vertical frame.

7. The load carrying attachment of claim 6 in which said connector portions of said first load carrying receptacle are hingedly secured to said receptacle whereby said receptacle may be pivoted about said leg portions.

8. The load carrying attachment of claim 3 in which said first load carrying receptacle is generally positioned in substantial vertical alignment with the rear axle of the lawn mower whereby any load supported within said receptacle will be directed generally vertically with respect to the rear axle.

9. The load carrying attachment of claim 8 in which said shelf member is generally offset horizontally with respect to said first load carrying receptacle.

10. A load carrying attachment for riding lawn mowers which have a rear axle adjacent the rear end thereof comprising a vertical frame having upper and lower end portions, means for securing said vertical frame to the rear end of the lawn mower, a first load carrying receptacle carried by said upper portion of said frame, said first load carrying receptacle extending forwardly of the rear end of the lawn mower and having a rear wall which is generally vertically aligned and substantially parallel with said vertical frame, a shelf member mounted adjacent said lower end portion of said frame, means for pivotally connecting said shelf member to said lower end portion of said vertical frame so that said shelf member may be extended rearwardly of the lawn mower, said shelf member being positionable substantially in abutting engagement with said vertical frame so as to be substantially coplanar with said rear wall of said first load carrying receptacle whereby said rear wall of said first load carrying receptacle, said shelf member and said vertical frame form a stabilizing support surface which may be utilized to retain the lawn mower in a vertical upright position on the rear end thereof.

11. The load carrying attachment of claim 10 in which said first load carrying receptacle is generally positioned in substantial vertical alignment with the rear axle of the lawn mower whereby any load supported within said receptacle will be directly generally vertically with respect to the rear axle.

12. The load carrying attachment for riding lawn mowers of claim 11 in which said first load carrying receptacle includes a rear wall which is pivotally connected thereto.

* * * * *

UNITED STATES PATENT AND TRADEMARK OFFICE
CERTIFICATE OF CORRECTION

PATENT NO. : 4,770,440
DATED : Sept. 13, 1988
INVENTOR(S) : Ladner

It is certified that error appears in the above-identified patent and that said Letters Patent is hereby corrected as shown below:

On the Title Page:

Correct line item [76], inventor should read:

-- Glyn F. Ladner --

Correct item [19] to read --Ladner--.

Signed and Sealed this

Tenth Day of January, 1989

Attest:

DONALD J. QUIGG

Attesting Officer

Commissioner of Patents and Trademarks